Patented July 4, 1933

1,916,431

UNITED STATES PATENT OFFICE

MARKUS LARSSON, OF BERLIN, GERMANY, ASSIGNOR TO KUNSTDÜNGER-PATENT-VERWERTUNGS-AKTIENGESELLSCHAFT, OF GLARUS, SWITZERLAND

PROCESS OF LEACHING PHOSPHATE ROCK

No Drawing. Application filed October 1, 1930, Serial No. 485,827, and in Sweden October 5, 1929.

This invention relates to an improved process of leaching phosphate rock for the purpose of producing phosphoric acid or soluble phosphates.

In my copending application Ser. No. 366,-078 I have described a process of leaching phosphate rock in which the phosphate rock is treated with sulphuric acid or any other mineral acid or mixtures of such acids with or without an addition of alkali sulphate for the purpose of producing phosphoric acid or soluble phosphates while the lime of the phosphate rock being converted into calcium sulphate. The leaching process according to said prior application is carried out in such manner that the calcium sulphate is precipitated as semihydrate or after the precipitation is converted into semihydrate at a high temperature and then by cooling or diluting or by said two steps in combination is converted into gypsum. By said recrystallization of the calcium sulphate the dissolving of the phosphate rock will be practically complete so that an output of 97% or more of the total quantity of phosphoric acid contained in the phosphate rock may be obtained.

I have now found that such high output of phosphoric acid is not always obtained. This is, for instance, the case when the calcium sulphate is first precipitated as dihydrate at a low temperature and then by heating is converted into semihydrate which again by recrystallization is converted into dihydrate in the solution. Although a good extraction of the phosphoric acid is obtained in such case before the semihydrate has been recrystallized into dihydrate a part of the phosphoric acid dissolved is again lost at the following recrystallization. It seems that said drawback is caused by phosphoric acid being included in the dihydrate crystals in such manner that it cannot be recovered by washing. The dihydrate obtained by the recrystallization, therefore, contains more insoluble phosphoric acid than the semihydrate.

The object of this invention is to avoid said drawback by performing the recrystallization of the semihydrate into dihydrate in a solution containing $SO_4$-ions i. e. free sulphuric acid or a soluble sulphate. Such solution is obtained by performing the leaching of the phosphate rock with an excess of sulphuric acid or acid alkali sulphate solution as compared with the soluble constituents of the phosphate rock.

When phosphate rock is leached with an equivalent quantity of sulphuric acid or acid alkali sulphate solution at such a high temperature, that the calcium sulphate is precipitated directly as semihydrate the extraction of the phosphoric acid will generally be less good inasmuch as it often not will exceed 80 to 90%. The solution thus produced will accordingly still contain a considerable quantity of sulphuric acid or alkali sulphate. In the recrystallization of the semihydrate said temporary excess of sulphuric acid or alkali sulphate has a dissolving action on the residue of the phosphate rock and at the same time the presence of free sulphuric acid or alkali sulphate prevents losses of phosphoric acid at the recrystallization of the semihydrate to dihydrate for which reason a rather high output of phosphoric acid can be obtained without any special measures. The use of an actual excess of sulphuric acid or alkali sulphate is, however, also in this case favourable as it affords an increased security against loss of phosphoric acid with the gypsum separated.

An excess of sulphuric acid or alkali sulphate at the leaching of phosphate rock according to the application Ser. No. 366,078 has acordingly always a favourable influence on the output. On the other hand it is not desirable to have an excess of sulphate in the finished product, as for instance would be the case when the phosphate rock is leached with an excess of sulphuric acid and the phosphoric acid after the separation of the calcium sulphate is neutralized with ammonia for the production of ammonium phosphate, inasmuch as the ammonium phosphate then will be obtained in mixture with a percentage of ammonium sulphate corresponding to the excess of sulphuric acid used.

Such an undesirable percentage of soluble sulphate in the phospate produced can be avoided in such manner, that before the separation of the recrystallized calcium sulphate phosphate rock is added to the phosphoric acid solution containing an excess of sulphuric acid or soluble sulphate in a sufficient quantity to consume said excess for the precipitation of a corresponding quantity of calcium sulphate. Practically, this means that the whole quantity of sulphuric acid or acid alkali sulphate solution required for the process is first mixed with the chief part of the equivalent quantity of phosphate rock and that the remainder of the phosphate rock is added after that the calcium sulphate precipitated has been recrystallized into dihydrate whereupon the calcium sulphate is separated.

Another method of securing the same result is to have an excess of alkali sulphate circulating in the process. Said excess is recovered as a mother liquor containing alkali sulphate at the evaporation of the neutralized ammonium phosphate solution produced, the mother liquor being added at the continued leaching or at the recrystallization of the semihydrate produced at the continued leaching. In such case sulphuric acid or acid alkali sulphate solution is used for the leaching in a quantity that is substantially equivalent to the phosphate rock.

Example.—1000 gr. of Florida phosphate were treated with 2050 gr. of sulphuric acid of the specific gravity 1.71 and a weak phosphoric acid solution (wash water from a preceding operation) was added in such quantity that the leaching resulted in a phosphoric acid solution containing about 30% of $P_2O_5$. The leaching was performed at a temperature of about 60° C., the calcium sulphate thus being precipitated as dihydrate. The reaction products were then heated to 95° C. until the dihydrate had been converted into semihydrate.

A portion of the phosphoric acid solution produced with its content of semihydrate was then diluted with water so that the percentage of $P_2O_5$ was lowered to 22% and the diluted solution was cooled until the semihydrate had recrystallized into gypsum. The washed and dried gypsum contained 1.22% of $P_2O_5$ in insoluble state.

Another portion of the same solution was diluted to the same strength while ammonium sulphate was added in such quantity that the diluted solution contained 5% of $(NH_4)_2SO_4$. The gypsum obtained at the recrystallization contained in this case only 0.65% of $P_2O_5$ in insoluble state. A third portion of the phosphoric acid solution with its content of semihydrate was diluted in the same manner and to the diluted solution sodium sulphate was added in such quantity that the solution contained 2.5% of $Na_2SO_4$. The gypsum obtained at the recrystallization contained in this case only 0.56% of $P_2O_5$ in insoluble state. The two last-mentioned figures prove in comparison with the first figure the importance of performing the recrystallization of the semihydrate into dihydrate in presence of an alkali sulphate.

For comparison a portion of the semihydrate was removed from the solution and washed with a strong solution of ammonium sulphate to prevent its recrystallization into dihydrate. The washed and dried semihydrate contained 0.98% of $P_2O_5$ in insoluble state.

What I claim is:—

1. In a method of treating phosphate rock in which the phosphate rock is leached with an acid solution containing an excess of $SO_4$-ions as compared with the lime content of the phosphate rock treated and the calcium sulphate formed is brought to crystallize successively as semihydrate and as dihydrate in the solution produced, the step which consists in performing the recrystallization in presence of said excess of $SO_4$-ions.

2. In a method of treating phosphate rock in which the phosphate rock is leached with an acid solution containing an excess of alkali sulphate as compared with the lime content of the phosphate treated and the calcium sulphate formed is brought to crystallize successively as semihydrate and as dihydrate in the solution produced, the step which consists in performing the recrystallization in presence of said excess of alkali sulphate.

3. In a method of treating phosphate rock in which the phosphate rock is leached with an acid solution containing alkali sulphate and the calcium sulphate formed is brought to crystallize successively as semihydrate and as dihydrate in the solution produced, the steps which consist in performing the recrystallization in presence of an excess of alkali sulphate as compared with the calcium dissolved, separating the gypsum from the acid solution, neutralizing the solution with ammonia, separating ammonium phosphate from the neutralized solution by crystallization, and returning the alkali sulphate to the process.

4. In a method of treating phosphate rock in which the phosphate rock is leached with an acid solution containing an excess of $SO_4$-ions as compared with the lime content of the phosphate treated and the calcium sulphate formed is brought to crystallize successively as semihydrate and as dihydrate in the solution produced, the steps which comprise performing the recrystallization of the calcium sulphate in presence of said excess of $SO_4$-ions in the solution, and then adding phosphate rock to the solution to precipitate the excess of $SO_4$-ions.

In testimony whereof I have signed my name.

MARKUS LARSSON.